United States Patent
Chang et al.

(10) Patent No.: US 6,949,872 B2
(45) Date of Patent: Sep. 27, 2005

(54) ELECTRO-OPTIC FILTER FOR PLASMA DISPLAY PANEL

(75) Inventors: Myeong Soo Chang, Uiwang (KR); Byung Gil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/301,651

(22) Filed: Nov. 22, 2002

(65) Prior Publication Data

US 2003/0111945 A1 Jun. 19, 2003

(30) Foreign Application Priority Data

Dec. 13, 2001 (KR) .......................................... 2001-79005

(51) Int. Cl.$^7$ .............................. H01J 17/49; H01J 5/16
(52) U.S. Cl. ........................ 313/112; 313/582; 313/587
(58) Field of Search ................. 313/110–112, 116–117, 313/582–587, 113–114

(56) References Cited

U.S. PATENT DOCUMENTS

| 4,170,772 A | * | 10/1979 | Bly ............................... 345/77 |
| 4,201,450 A | * | 5/1980 | Trapani ....................... 359/254 |
| 4,636,786 A | * | 1/1987 | Haertling ..................... 345/84 |
| 5,838,103 A | | 11/1998 | Park ............................. 313/495 |
| 6,222,667 B1 | * | 4/2001 | Gobeli ......................... 359/323 |
| 6,242,859 B1 | | 6/2001 | Betsui et al. ................ 313/584 |
| 6,242,860 B1 | * | 6/2001 | Sasao et al. ................. 313/586 |
| 6,309,564 B1 | * | 10/2001 | Harada et al. .............. 252/587 |
| 6,344,080 B1 | | 2/2002 | Kim et al. .............. 106/287.23 |

FOREIGN PATENT DOCUMENTS

| JP | 59-091478 A | | 5/1984 | |
| JP | 07146657 A | * | 6/1995 | ............ G09F/9/30 |
| JP | 08-317323 A | | 11/1996 | |
| JP | 09-110592 A | | 4/1997 | |
| JP | 09-198729 A | | 7/1997 | |
| JP | 11-084378 A | | 3/1999 | |

OTHER PUBLICATIONS

Foreign Office Action.

* cited by examiner

*Primary Examiner*—Nimeshkumar D. Patel
*Assistant Examiner*—German Colón
(74) *Attorney, Agent, or Firm*—Fleshner & Kim LLP

(57) ABSTRACT

A plasma display panel includes a filter for controlling a light transmittance by selectively diffracting a light emitted from a discharge cell of a plasma display panel on the basis of an electric signal. A luminance efficacy can be enhanced by using the low-priced filter and the contrast of a plasma display panel can be improved.

5 Claims, 3 Drawing Sheets

ELECTRO-OPTIC FILTER FOR PLASMA DISPLAY PANEL

BACKGROUND OF THE INVENTION

1. Field of the Invention

The present invention relates to a plasma display panel, and more particularly, to a plasma display panel that is capable of improving a contrast of a plasma display panel.

2. Description of the Background Art

In general, a plasma display panel is a display device which excites a fluorescent layer by using an ultraviolet ray of plasma and displays an image by using a visible light generated from the fluorescent layer.

In a conventional plasma display panel, a contrast is degraded due to a near infrared ray or a visible light generated from a discharge gas and an external visible light reflected after being irradiated from outside. Thus, in the conventional art, in order to improve the contrast, a liquid crystal filter is adopted to the plasma display panel.

In case of adopting the liquid crystal filter to the plasma display panel, a fabrication process is complicated to degrade an yield and a fabrication cost is increased.

The structure of the conventional plasma display panel adopting the liquid crystal filter will now be described with reference to FIG. 1.

FIG. 1 is a sectional view showing the structure of the conventional plasma display panel.

As shown in FIG. 1, the conventional plasma display panel includes: a lower insulation film 9 formed on a lower glass substrate 10; an address electrode 11 formed on a certain portion of the lower insulation film 9; a lower dielectric layer 8 formed on the address electrode 11 and on the lower insulation film 9; a barrier rib 7 defined at a certain portion on the lower dielectric layer 8 to divide discharge cells; a black matrix layer 12 formed on the barrier rib 7; a fluorescent layer 13 formed with a certain thickness on the side of the black matrix 12 and the barrier rib 7 and on the lower dielectric layer 8, and emitting each red, green and blue visible light upon receiving an ultraviolet ray; an upper glass substrate 2; a sustain electrode 3 formed on a certain portion of the upper glass substrate 2 so as to intersect with the address electrode 11 with a certain space vertically therebetween; a bus electrode 5 formed on a certain portion of the sustain electrode 3; an upper dielectric layer 4 formed on the bus electrode 5, the sustain electrode 3 and the upper glass substrate 2; a passivation layer 6 formed on the upper dielectric layer 4 in order to protect the upper dielectric layer 4; and a liquid crystal filter 1 formed on the upper glass substrate 2 and cutting off or transmitting the visible light emitted from the plasma display panel according to whether a voltage is supplied thereto.

The operation of the conventional plasma display panel will now be described.

First, an SLS (Soda-lime Silicate (SLS)) glass substrate is used as the upper glass substrate 2 and the lower glass substrate 10 of the conventional plasma display panel.

The lower insulation film 9 is positioned on the lower glass substrate 10, the SLS glass substrate, and the address electrode 11 is positioned at a certain portion on the lower insulation film 9.

The lower dielectric layer 8 positioned on the address electrode 11 and the lower insulation film 9 interrupts a visible light emitted in the direction of the lower glass substrate 10. In order to increase a luminous efficacy, a dielectric layer with a high reflectance is used as the lower dielectric layer 8.

The fluorescent layer 13 consists of red, green and blue fluorescent materials, and emits a visible light of a specific wavelength according to an intensity of an ultraviolet ray owing to a plasma generated in the region between the barrier ribs 7.

The sustain electrode 3 is positioned at a lower surface of the upper glass substrate 2, the SLS glass substrate, which intersects the address electrode 11 in a vertical direction. A bus electrode 5 is positioned at a certain portion on the sustain electrode 3, and a dielectric layer 4 with an excellent light transmittance is positioned on the dielectric layer 4.

The passivation film 6 is positioned on the dielectric layer 4 to prevent a damage of the dielectric layer 4 owing to occurrence of plasma.

Thereafter, when a voltage required for a preliminary discharge is applied to the sustain electrode 3, there occurs a voltage difference between the bus electrode 5 and the address electrode 11 which intersects the bus electrode 5 in the vertical direction.

Owing to the voltage difference, the gas positioned at the region between the barrier ribs 7 turns to a plasma state, and a visible light of a specific wavelength is emitted from the fluorescent film 13 due to an ultraviolet ray generated from the plasma.

The preliminary discharge refers to a process of generating an electric charge on the surface of the dielectric (the dielectric layers 4 and 8) in order to increase a driving speed of the plasma display panel. In this case, however, when the electric charge is generated on the surface of the dielectric, a basic discharge is being made even in a state that each discharge cell is in an OFF state, causing a problem that a small amount of (dim) light is generated from each discharge cell.

For example, as for the plasma display panel, the discharge gas in the pixel region defined by the barrier rib 7 becomes plasma due to a potential difference between the address electrode and the bus electrode 5, the fluorescent film 13 is excited by the ultraviolet ray of the plasma to generate the visible light, and an image is displayed by using the visible light.

That is, a desired color is displayed by exciting the fluorescent film 13 by using the ultraviolet ray generated by Xe gas among the discharge gases consisting of He gas, Xe gas and Ne gas injected into the discharge space divided by the barrier ribs 7.

At this time, the plasma display panel should have a high contrast. The contrast herewith refers to a ratio of the brightest portion of a screen to the darkest portion.

For example, the greater the difference between the maximum brightness and the minimum brightness of the display panel is, the more the display characteristics (i.e., the contrast) of the screen is improved.

The maximum brightness can be increased by improving a constitution of phosphor or a fabrication technique, or can be also increased by improving a driving method.

Meanwhile, as the method of increasing the maximum brightness has reached its limit, a method of reducing the minimum brightness is sought. In this respect, however, in the conventional art, the preliminary discharging is performed to increase the driving speed of the plasma display panel. It is difficult to lower the minimum brightness.

Namely, when the electric charge is generated on the surface of the dielectric to increase the driving speed of the plasma display panel, the basic discharging is being made even in the state that each discharge cell is in the OFF state, emitting a small amount of light from each discharge cell.

Thus, in the conventional art, in order to lower the minimum brightness of the plasma display panel, the liquid crystal filter 1 is formed on the upper glass substrate 2.

That is, in the preliminary discharge of the plasma display panel, the visible light (the small amount of light) emitted from the plasma display panel is interrupted by applying a voltage to the liquid crystal filter 1, thereby reducing the minimum brightness.

Meanwhile, in case of displaying an image through the plasma display panel on a screen, a voltage applied to the liquid crystal filter 1 is interrupted to transmit the visible light emitted from the plasma display panel to display an image.

The liquid crystal filter 1 includes: a lower electrode (not shown) positioned on the upper glass substrate 2; a liquid crystal (not shown) positioned on the lower electrode and determining a light transmittance upon receiving a voltage; and an upper electrode (not shown) positioned on the liquid crystal.

The liquid crystal filter 1, changing the light transmittance depending on the difference between the voltages applied to the lower electrode and the upper electrode, has a simple filter type by adopting the method used for the liquid crystal display (LCD).

However, in case that the image is displayed through the liquid crystal filter 1 formed on the upper glass substrate, the transmittance of the visible light is reduced as the visible light transmits the liquid crystal, resulting in reduction in the overall luminous efficacy.

In addition, in case that the liquid crystal filer 1 is formed on the upper glass substrate 2, the thickness and weight of the plasma display panel are increased. Moreover, use of the high-priced liquid crystal increases a fabrication cost of the plasma display panel.

Meanwhile, other plasma display panels and their fabrication methods are disclosed in detail in the U.S. Pat. No. 5,838,106 registered on Nov. 17, 1998, a U.S. Pat. No. 6,242,859 registered on Jun. 5, 2001 and the U.S. Pat. No. 6,344,080 registered on Feb. 5, 2002.

As stated above, in the conventional art, since the liquid crystal filter is formed on the upper glass substrate of the plasma display panel in order to improve the contrast by lowering the minimum brightness of the panel, the light transmittance is reduced, which causes the degradation of the luminous efficacy of the plasma display panel.

In addition, since the liquid crystal filter is formed on the upper glass substrate of the plasma display panel, the thickness and the weight of the plasma display panel are increased.

Moreover, since the liquid crystal formed on the upper glass substrate of the plasma display panel is expensive, the fabrication cost of the plasma display panel is increased.

SUMMARY OF THE INVENTION

Therefore, an object of the present invention is to provide a plasma display panel that is capable of enhancing a luminance efficacy by using a low-priced filter and improving a contrast of a plasma display panel.

To achieve these and other advantages and in accordance with the purpose of the present invention, as embodied and broadly described herein, there is provided a plasma display panel including a filter for controlling a light transmittance by selectively diffracting a light emitted from a discharge cell of a plasma display panel on the basis of an electric signal.

To achieve the above objects, there is also provided a plasma display panel having a plurality of discharge cells constructed by forming barrier ribs between an upper glass substrate and a lower glass substrate, further including: an electro-optic filter formed on the upper glass substrate and selectively diffracting a light emitted from the discharge cell on the basis of an electric signal.

To achieve the above objects, there is also provided a plasma display panel having an upper glass substrate, a sustain electrode formed on the upper glass substrate; a bus electrode formed on the sustain electrode; a lower glass substrate; a lower dielectric layer and an address electrode formed on the lower glass substrate, a fluorescent layer formed on the lower dielectric layer and the address electrode; and a barrier rib formed on the lower dielectric layer, further including: an electro-optic filter formed on the upper glass substrate and selectively diffracting a light emitted from the discharge cell of the plasma display panel through the upper glass substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention provides a plasma display panel with an improved contrast and a luminous efficacy by forming on an upper glass substrate an electro-optic filter for controlling a light transmittance by selectively diffracting a light emitted from a discharge cell of the plasma display panel.

Figure 1:
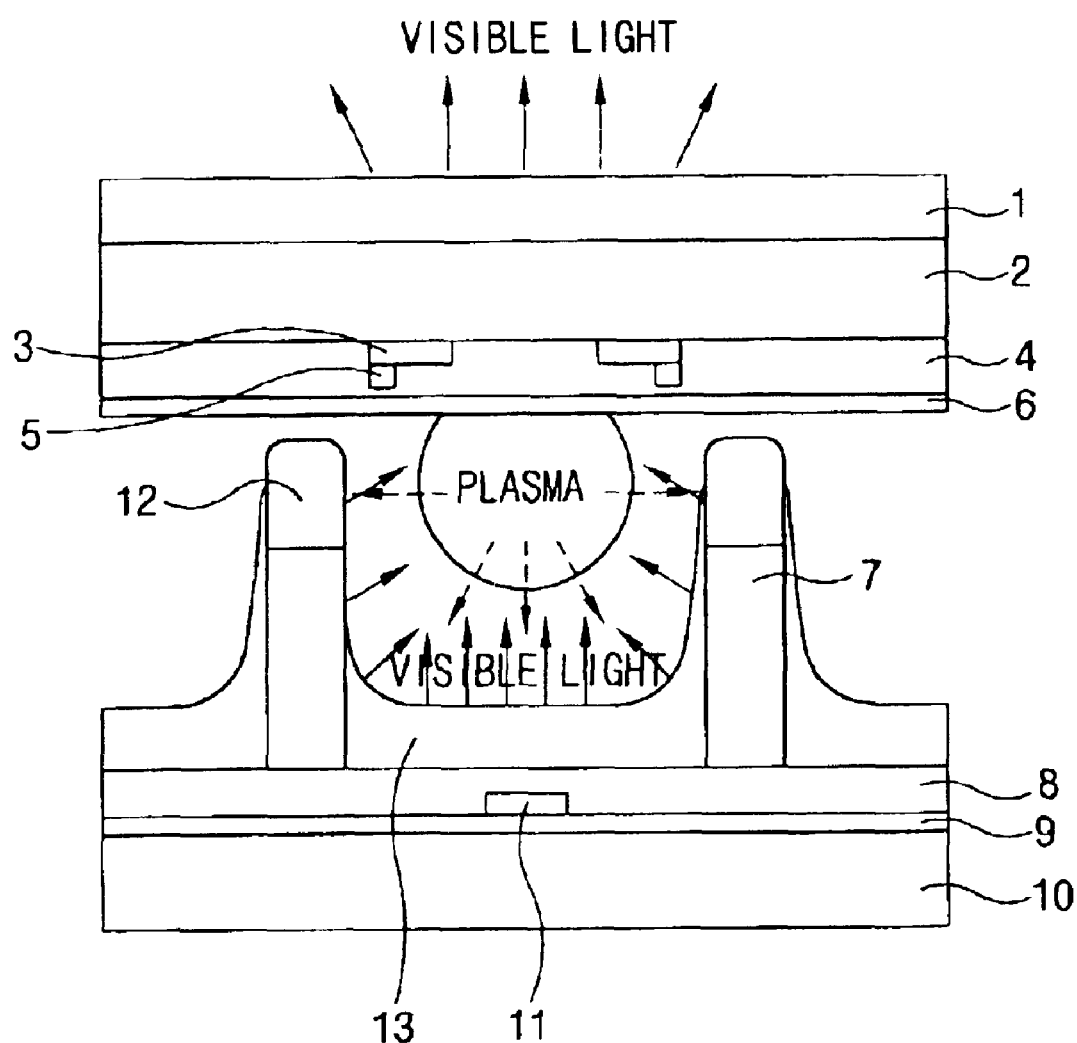
FIG. 1 is a sectional view showing the structure of a plasma display panel in accordance with a conventional art.
Figure 2:
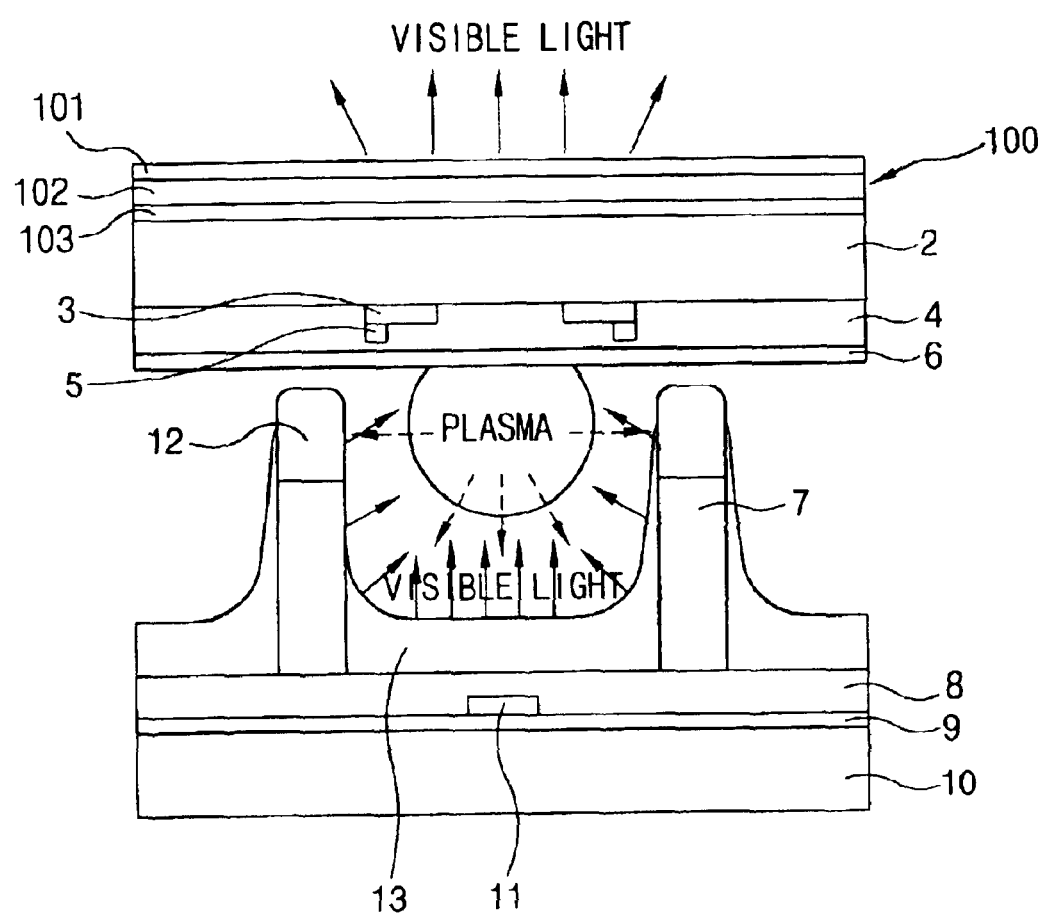
FIG. 2 is a sectional view showing the structure of a plasma display panel in accordance with the present invention.

FIG. 2 is a sectional view showing the structure of a plasma display panel in accordance with the present invention.

As shown in FIG. 2, the plasma display panel includes: a lower insulation film 9 formed on a lower glass substrate 10; an address electrode 11 formed on a certain portion of the lower insulation film 9; a lower dielectric layer 8 formed on the address electrode 11 and the lower insulation film 9; a barrier rib 7 defined to a certain portion on the lower dielectric film 8 to divide discharge cells; a black matrix layer 12 formed on the barrier rib 7; a fluorescent layer 13 formed with a certain thickness on the side of the black matrix film 12 and the barrier rib 7 and on the lower dielectric layer 8 and emitting a visible light of red, green and blue upon receiving an ultraviolet ray; an upper glass substrate 2; a sustain electrode 3 formed at a certain portion on the upper glass substrate 2 so as to intersect the address electrode 11 with a certain space vertically therebetween; a bus electrode 5 formed at a certain portion on the sustain electrode 3; an upper dielectric layer 4 formed on the bus electrode 5, the sustain electrode 3 and the upper glass substrate 2; a passivation film 6 formed on the upper dielectric layer 4 to protect the upper dielectric layer 4; and an electro-optic filter 100 positioned on the upper glass substrate 2 and selectively controlling a light transmittance by selectively diffracting a light emitted from the discharge cell on the basis of an electric signal, to improve a contrast and a light transmittance of the panel.

The contrast, a factor for evaluating a picture quality of a screen of a television or a photograph, refers to a ratio between the brightness of the brightest portion (the maximum brightness) and the darkest portion (the minimum brightness) of the screen.

In the present invention, the brightness of the darkest portion is darkened by using the electro-optic filter 100, thereby improving a contrast of the panel.

In addition, the light transmittance is increased by selectively diffracting the light emitted from the discharge cell by using the electro-optic filter 100, and thanks to the increased light transmittance, the luminous efficacy of the plasma display panel is increased.

The construction of the plasma display panel of the present invention is the same as the conventional art, except the electro-optic filter 100. Thus, descriptions for the same construction is omitted.

The electro-optic filter 100 positioned on the upper glass substrate 2 and selectively controlling the light transmittance by selectively diffracting the light emitted from the discharge cell on the basis of an electric signal in accordance with a preferred embodiment of the present invention will now be described with reference to FIG. 3.

Figure 3:
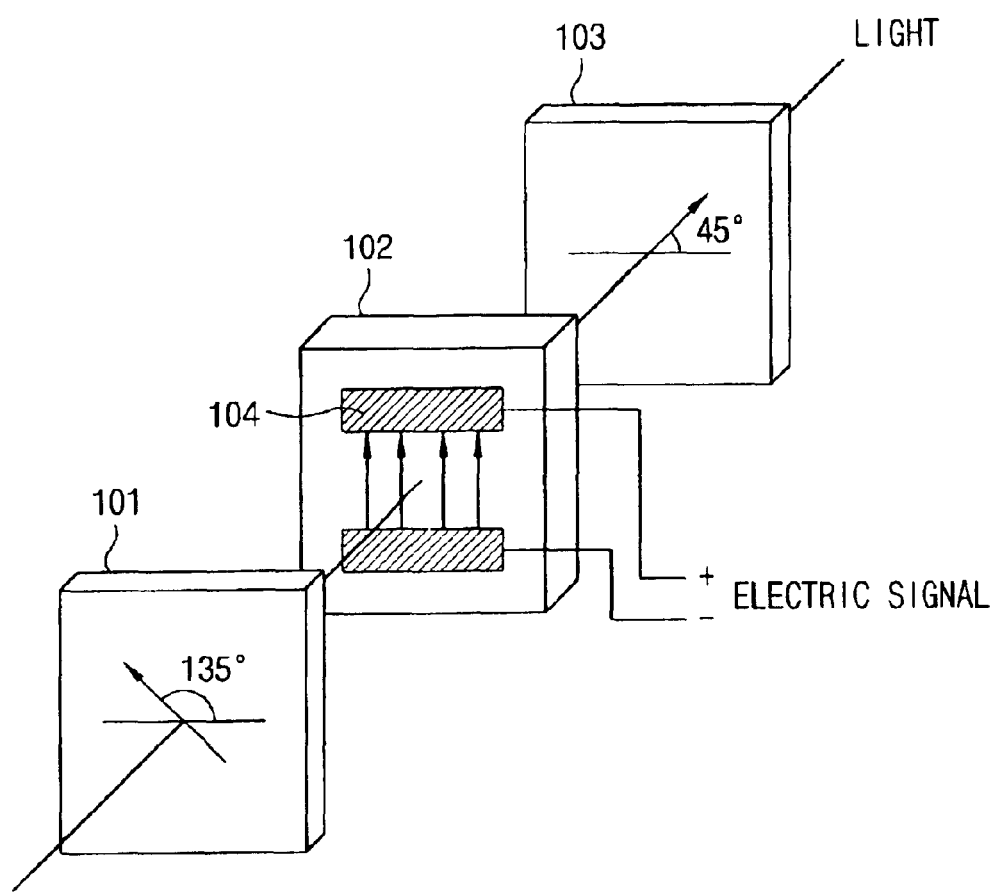
FIG. 3 is a schematic view showing the construction of an electro-optic filter adopted for the plasma display panel in accordance with the present invention.

FIG. 3 is a schematic view showing the construction of an electro-optic filter adopted for the plasma display panel in accordance with the present invention.

As shown in FIG. 3, the electro-optic filter 100 positioned on the upper glass substrate 2 and selectively controlling a light transmittance by selectively diffracting a light emitted from the discharge cell on the basis of an electric signal includes: a lower polarizer 103 for transmitting a light emitted from the discharge cell and having a polarization direction of 45°; a lead lanthanum zirconium titanate plate (PLZT) 102 positioned on the lower polarizer 103 and selectively diffracting a light transmitted through the lower polarizer 103 on the basis of the electric signal; and an upper polarizer 101 for selectively transmitting the diffracted light and having a polarization direction of 135°

An electrode 104 is formed at a certain portion of the PZLT plate 102 of the electro-optic filter 100 in order to receive the electric signal and apply an electric field in a direction of being perpendicular to a light transmittance direction.

The upper polarizer 101 transmits only a light diffracted by the PLZT plate 102. The PLZT, an electrooptic material, has a composition of PbO—Li$_2$O—ZiO$_2$—TiO$_2$ group. The PLZT is a ferroelectric ceramic material with an ABO$_3$ perovskite structure. Among the ABO$_3$, the 'A' ion is made of one of Pb$^{2+}$, Ba$^{2+}$ and La$^{3+}$ and the 'B' ion is made of one of Ti$^{4+}$, Zr$^{4+}$ and Nb$^{5+}$.

The PLZT, the electrooptic material, changes a phase of a light (the light emitted from the discharge cell) by an electric field or a current applied from an external source. That is, the PLZT controls a diffraction of the light by the electric signal.

The PLZT does not control an amount of light but change a phase of the light according to the electric signal, and if no electric field is supplied to the PLZT (a state of not being activated), the PLZT interrupts the visible light, whereas if the electric field is supplied to the PLZT (a state of being activated), the PLZT transmits the light.

That is, the PLZT can transmit or interrupt the light by controlling a polarization path (direction) of the light between the lower and upper polarizers 103 and 101.

For example, the polarization direction of the lower polarizer 103 is in the direction of 45°, and the polarization direction of the upper polarizer 101 is 135°.

That is, the polarization direction of the lower polarizer 103 and that of the upper polarizer 101 show the difference of 90°.

At this time, an electric field is applied to the PLZT plate 102 in the direction of vertically intersecting the light proceeding direction.

Thereafter, the light transmitted through the lower polarizer 103 with the polarization direction of 45° by the electric field is diffracted by 90° by the PLZT 102. In this case, since the direction of the light diffracted by 90° (45°+90°+135°) is the same as the polarization direction of the upper polarizer 101 with the polarization direction of 135°, the light diffracted through the PLZT 102 can transmit the upper polarizer 101.

In case of displaying an image through the plasma display panel, the light (visible light) emitted from the plasma display panel is diffracted by applying a voltage to the electro-optic filter 100 so that the visible light emitted from the plasma display panel can be transmitted through the upper and lower polarizers 103 and 101, thereby displaying an image.

That is, in the present invention, the visible light emitted from the plasma display panel is selectively diffracted through the electro-optic filter 100 to display an image. Thus, a light transmittance can be more increased than that of the conventional liquid crystal filter and the luminous efficacy of the plasma display panel can be increased thanks to the increased light transmittance.

Meanwhile, if no electric field is applied to the electrode 104 formed on the PLZT 102, the PLZT 102 does not diffract the light transmitted through the lower polarizer 103 having the polarization direction of 45° but transmits it as it is.

At this time, since the direction (45°) of the light transmitted as it is through the PLZT 102 is different from the polarization direction of the upper polarizer 101 having the polarization direction of 135°, the light transmitted as it is through the PLZT 102 can not transmit the polarizer 101. In this respect, the light transmitting the lower polarizer 103 signifies a visible light emitted from the discharge cell in the plasma display panel.

For example, if no electric field (voltage) is applied to the electro-optic filter 100 during the preliminary discharge period of the plasma display panel, the electro-optic filter 100 interrupts the small amount of light (visible light)

emitted from the plasma display panel to reduce the minimum brightness.

The preliminary discharging refers to a process of generating an electric charge on the surface of the dielectric in order to increase a driving speed of the panel. If the electric charge is generated on the surface of the dielectric, a discharging is basically made even in a state that each discharge cell is turned off, so that a small amount of light is generated from each discharge cell.

The minimum brightness signifies a brightness of the small amount of light. If the minimum brightness is reduced, the contrast of the panel is improved, and accordingly, the picture quality of the plasma display panel is also improved.

The electro-optic filter 100 receives a voltage (an electric signal) applied from a driving circuit which drives the conventional plasma display panel, rather than by using an additional driving circuit, and diffracts the light emitted from the discharge cell.

Meanwhile, the electro-optic filter 100 can be directly coated on the upper glass substrate 2.

For example, the electro-optic filter 100 can be fabricated such that the lower polarizer 103, the PLZT layer 102, the electrode 104 and the upper polarizer 101 are sequentially stacked on the upper glass substrate 2, which are subjected to a chemical vapor deposition (CVD), a sputtering, an electron beam deposition or a sol-gel coating The electrode 104 is formed by depositing an ITO (Indium Tin Oxide) transparent electrode or a metal such as Cu or Ag on the PLZT layer 102 and pattering it.

The electro-optic filter 100 may be formed such that the lower polarizer 103 is formed on a base film, on which the PLZT is coated and patterned to form an electrode pattern, on which the electrode 104 is formed, the upper polarizer 101 is formed on the PLZT 102 and the electrode 104, and then a passivation film is formed on the upper polarizer 101. In this respect, in case that the electrooptic filer 100 is intended to be adhered onto the glass substrate 2, it is adhered onto the glass substrate 2 after removing the passivation film of the electro-optic filter 100.

Meanwhile, in a method of forming the electro-optic filter 100 on the front filter of the plasma display panel, the PLZT layer is formed on the glass or a plastic substrate, a polarizer, and patterned to form an electrode pattern.

At this time, rather than forming the electrode 104 at the electrode pattern, an electromagnetic interference (EMI) preventing mesh electrode (not shown) or a transparent electrode (an Indium Tin Oxide electrode) which is used for the front filter of the conventional art can be used instead of the electrode 104. That is, without adding the electrode 104 forming process, the electro-optic filter 100 can be fabricated.

The electro-optic filter 100 may be formed to be positioned at the front o the upper glass substrate 2.

In addition, if the electro-optic filter 100 is fabricated such that it is independently driven in each cell region, since the luminance characteristics can be controlled by each discharge cell unit, the contrast of the panel can be improved.

As so far described, the plasma display panel of the present invention has many advantages.

That is, for example, first, the visible light emitted from the discharge cell is selectively diffracted through the electro-optic filter formed on the glass substrate which transmits a light emitted from the discharge cell of the plasma display panel, thereby controlling the light transmittance. Thus, the contrast of the panel can be more improved than that of the conventional liquid crystal filter. That is, by improving the contrast of the panel, the picture quality of the plasma display panel can be much improved Second, the visible light emitted from the discharge cell of the plasma display panel is selectively diffracted through the electro-optic filter, to thereby control the light transmittance. Thus, the light transmittance can be increased compared to that of the conventional liquid crystal filter. That is, the light transmittance of the plasma display panel can be increased thanks to the increased light transmittance.

Third, since the visible light emitted from the discharge cell of the plasma display panel is selectively diffracted through the electro-optic filter, to thereby control the light transmittance, the plasma display panel can be fabricated thin and light-weight.

Finally, by controlling the light transmittance by selectively diffracting the visible light emitted from the discharge cell of the plasma display panel through the electro-optic filter, the fabrication cost of the plasma display panel can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. A plasma display panel, comprising:

an upper glass substrate;

a sustain electrode formed on a certain portion of the upper glass substrate;

a bus electrode formed at a certain portion on the sustain electrode;

a lower glass substrate;

a lower insulation film formed on the lower glass substrate;

an address electrode formed at a certain portion on the lower insulation film;

a lower dielectric layer formed on the address electrode and the lower insulation film;

a barrier rib defined at a certain portion on the lower dielectric layer in order to divide discharge cells; and a fluorescent layer formed on the lower dielectric layer and emitting a visible light of red, green and blue upon receiving an ultraviolet ray, an electro-optic filter formed on the upper glass substrate of the plasma display panel selectively blocks light emitted from the discharge cells of the plasma display panel during a preliminary discharge, wherein the electro-optic filter comprises:

a first polarizer transmitting a light emitted from the discharge cell and having a first polarization direction;

a PLZT (lead lanthanum zirconium titanate) plate positioned on the first polarizer selectively diffracting the light transmitted through the first polarizer on the basis of an electric signal; and a second polarizer receiving light transmitted through the PLZT plate and having a second polarization direction.

2. The electro-optic filter of claim 1, wherein the first polarization direction is 45°, the second polarization direction is 135°, and the PLZT plate diffracts the light transmitted through the first polarizer by 90°.

3. The electro-optic filter of claim 1, wherein the PLZT plate includes an electrode for applying an electric field in a direction of being perpendicular to the light transmission direction.

4. The electro-optic filter of claim 1, wherein the PLZT has a composition of $PbO$—$Li_2O$—$ZrO_2$—$TiO_2$ group.

5. The electro-optic filter of claim 1, wherein the PLZT is made of a ferroelectric ceramic material with an $ABO_3$ perovskite structure, and 'A' ion of the $ABO_3$ is one of $Pb^{2+}$, $Ba^{2+}$, $La^{3+}$ and 'B' ion is one of $Ti^{4+}$, $Zr^{4+}$ and $Nb^{5+}$.

\* \* \* \* \*